United States Patent [19]

Iwayama et al.

[11] Patent Number: 4,511,547
[45] Date of Patent: Apr. 16, 1985

[54] PROCESS FOR PREPARING CRYSTALLINE ALUMINOSILICATE ZEOLITES USING A CARBOXYLIC ACID

[75] Inventors: Kazuyoshi Iwayama, Kamakura; Takao Kamano, Yokohama; Kuniyuki Tada, Kamakura; Takehisa Inoue, Tokyo, all of Japan

[73] Assignee: Toray Industries, Incorporated, Tokyo, Japan

[21] Appl. No.: 564,357

[22] Filed: Dec. 22, 1983

Related U.S. Application Data

[63] Continuation of Ser. No. 342,773, Jan. 26, 1982, abandoned.

[30] Foreign Application Priority Data

Jan. 27, 1981 [JP] Japan ................................ 56-9633

[51] Int. Cl.³ ........................................... C01B 33/28
[52] U.S. Cl. ................................... 423/329; 423/328; 423/330; 502/77
[58] Field of Search ...................... 423/329, 328, 330; 260/448 C; 502/77

[56] References Cited

U.S. PATENT DOCUMENTS 3,676,063  7/1972  Elo et al. ............................ 423/329
3,702,886 11/1972  Argauer et al. ..................... 423/328
4,296,083 10/1981  Rollmann ........................... 423/329

OTHER PUBLICATIONS

F. Wolf et al., Zeitshrift Fuer Chemie, vol. 12, 11, pp. 422 and 423, (1972), Leipzig, (DE).

Primary Examiner—Gary P. Straub
Assistant Examiner—Jackson Leeds
Attorney, Agent, or Firm—Stevens, Davis, Miller & Mosher

[57] ABSTRACT

A crystalline aluminosilicate zeolite is obtained by stirring under heating an aqueous reaction mixture containing a silica source, an alumina source, an alkali source and an organic carboxylic acid not containing an aromatic ring preferably having 3 to 6 carbon atoms and 1 to 3 carboxyl groups.

7 Claims, No Drawings

PROCESS FOR PREPARING CRYSTALLINE ALUMINOSILICATE ZEOLITES USING A CARBOXYLIC ACID

This application is a continuation of application Ser. No. 342,773, filed Jan. 26, 1982 now abandoned.

BACKGROUND OF THE INVENTION

The present invention relates to a process for preparing crystalline aluminosilicate zeolites.

Crystalline aluminosilicate zeolites (hereinafter referred to simply as zeolites) have as a basic skeletal structure thereof a three-dimensional network of $SiO_4$ and $AlO_4$ in which the tetrahedra are cross-linked by the sharing of oxygen atoms whereby the ratio of oxygen atoms to the total aluminium and silicon atoms, i.e. $O/(Al+Si)$, is equal to 2. Therefore, the negative electrovalence of the tetrahedra containing aluminium is electrically balanced by the inclusion in the crystal of a cation, for example, an alkali metal ion, an alkaline earth metal ion, an ammonium ion, or a hydrogen ion. It is well known, as one of most important properties of zeolites, that these cations can be replaced with other cations by a conventional ion exchange method.

It is also well known that the crystal of zeolites has a large number of small cavities of the molecular order, which cavities are interconnected by a number of still smaller channels. Generally, these small cavities are occupied by water of hydration. After this water of hydration is dehydrated at least partially under suitable conditions, other molecules can be adsorbed and held within those small cavities. In other words, zeolites have a characteristic as an adsorbent. The size and shape of molecules which can be adsorbed are restricted by the dimensions of those pores. Consequently, it becomes possible to effect the so-called adsorptive separation in which some particular molecule is separated from a mixture which contains the molecule on the basis of the size or shape thereof. Furthermore, in addition to the size and shape of molecule, there are factors which permit a selective adsorption of a certain kind of molecule. For example, these factors include the polarizability and the degree of unsaturation of the adsorbed molecule, as well as the polarizing force, the size of cations and the degree of hydration within the pores of the zeolites. With these factors it is also made possible to effect a selective adsorption.

Another characteristic feature of zeolites is their high catalytic activity. Particularly, by replacing the ion-exchangeable alkali metal ions of zeolites with ammonium ions, hydrogen ions, or polyvalent metal cations, e.g. rare earth metal ions, a solid acidity is developed, which exhibits a high catalytic activity in many reactions.

Zeolites generally include natural and synthetic zeolites. Examples of natural zeolites include analcite, natrolite, heulandite, clinoptilolite, phillipsite, mordenite, chabazite and faujasite. Examples of synthetic zeolites include zeolites A, B, D, E, F, G, H, J, L, M, Q, R, S, T, U, X, Y, and Z.

In general, natural zeolites contain many amorphous substances or other heterogeneous zeolites or crystals which are not zeolites, such as feldspar and quartz, and their crystallinity is low. Usually, due to the presence of these impurities, the pores of zeolites are closed and the zeolites cannot fully exhibit the advantageous characteristics.

In the case of synthetic zeolites, purity can be made extremely high, and the pore diameter uniform, so that synthetic zeolites have superior characteristics as adsorbents or catalysts as compared with natural zeolites. For this reason, a large number of zeolites have so far been prepared, part of which are industrially produced and used in many applications.

Generally, zeolites are produced by preparing an aqueous reaction mixture containing a silica source, an alumina source, an alkali source and/or an alkaline earth metal source and crystallizing it under reaction conditions under which the zeolites can be prepared.

However, many of the conventional synthetic zeolites are relatively low in the silica to alumina ratio. In general, there is the tendency that as the silica to alumina ratio becomes higher, the catalytic activity and the heat resistance become higher as well. The preparation of zeolites having a high silica to alumina ratio is disclosed, for example in U.S. Pat. No. 3,702,886, in which an organic quaternary ammonium is added to the zeolite preparing system. However, the organic quaternary ammonium has drawbacks such as its expense. It also emits an offensive odor and thus is difficult to handle and corrodes the apparatus in which it is used. The use of a quaternary ammonium is further disadvantageous in that quaternary ammonium ions are incorporated as cations in the zeolite prepared and then it becomes difficult to exchange into desirable cations.

SUMMARY OF THE INVENTION

It is an object of the present invention to overcome the foregoing disadvantages of the prior arts.

It is another object of the present invention to provide a process for preparing novel zeolites which exhibit a superior effect as adsorbents or solid acid catalysts.

Other objects and advantages of the present invention will become apparent from the following description.

The aforesaid objects of the present invention can be attained by incorporating an organic compound having at least one carboxyl group into the reaction system in preparing a zeolite by reacting an aqueous reaction mixture containing a silica source, an alumina source and an alkali source.

PREFERRED EMBODIMENTS OF THE INVENTION

According to the present invention, an aqueous reaction mixture consisting of a silica source, an alumina source, an alkali source and an organic compound having at least one carboxyl group (represented by $SiO_2$, $Al_2O_3$, $OH^-$ and A, respectively) is prepared in some particular condition, for example, in such a manner that it is within the following composition range in terms of mole ratios:

|  | Preferable Range | More Preferable Range | Most Preferable Range |
|---|---|---|---|
| $SiO_2/Al_2O_3$ | above 5 | above 20 | 25~500 |
| $H_2O/SiO_2$ | 5~100 | 5~100 | 10~50 |
| $OH^-/SiO_2$ | 0.01~1.0 | 0.05~0.40 | 0.10~0.35 |
| $A/Al_2O_3$ | above 0.05 | 0.10~200 | 0.10~100 |

Then, the aqueous reaction mixture is reacted until crystals of zeolite are formed, whereby a novel crystalline aluminosilicate having the X-ray diffraction pattern of Table 1 can be prepared. In the reaction mixture composition, the OH⁻ which represents alkali has been calculated assuming that only —COOH group in the organic compound reacts with alkali.

Also, by preparing the aforesaid reaction mixture in some particular condition, for example, in such a manner as to fall under the following composition range in terms of mole ratios and allowing it to react until crystals of zeolite are formed, there can be prepared a mordenite type zeolite having the X-ray diffraction pattern of Table 2:

|  | Preferable Range | More Preferable Range | Most Preferable Range |
|---|---|---|---|
| $SiO_2/Al_2O_3$ | 9~100 | 9~75 | 9~50 |
| $H_2O/SiO_2$ | 5~100 | 10~50 | 10~50 |
| $OH^-/SiO_2$ | 0.10~0.50 | 0.14~0.40 | 0.15~0.35 |
| $A/Al_2O_3$ | 0.05~100 | 0.10~50 | 0.10~20 |

If the compositions of the reaction mixtures are expressed in terms of range, both overlap in several regions.

If expressed in a qualitative manner, mordenite type zeolite is apt to be produced at a relatively low $SiO_2/Al_2O_3$ ratio or at a relatively high $OH^-/SiO_2$ ratio.

TABLE I

| X-ray diffraction pattern | |
|---|---|
| d(Å) | 100 I/Io |
| 11.2 ± 0.2 | S |
| 10.1 ± 0.2 | S |
| 9.8 ± 0.2 | M |
| 6.37 ± 0.1 | W |
| 6.00 ± 0.1 | W |
| 5.71 ± 0.1 | W |
| 5.58 ± 0.1 | W |
| 4.37 ± 0.08 | W |
| 4.27 ± 0.08 | W |
| 3.86 ± 0.08 | VS |
| 3.82 ± 0.02 | VS |
| 3.75 ± 0.08 | S |
| 3.72 ± 0.08 | S |
| 3.66 ± 0.05 | M |
| 3.00 ± 0.05 | M |
| 2.00 ± 0.05 | W |

In the above table (and also in the following tables) the relative strength (100I/Io) is expressed as follows: VS=very strong, S=strong, M=medium strength, W=weak.

TABLE 2

| X-ray diffraction pattern | |
|---|---|
| d(Å) | 100 I/Io |
| 13.6 ± 0.2 | M |
| 10.2 ± 0.2 | W |
| 9.0 ± 0.2 | S |
| 6.56 ± 0.1 | S |
| 6.40 ± 0.1 | M |
| 6.05 ± 0.1 | W |
| 5.80 ± 0.1 | M |
| 4.52 ± 0.08 | M |
| 3.99 ± 0.08 | S |
| 3.83 ± 0.08 | W |
| 3.76 ± 0.08 | W |
| 3.53 ± 0.05 | W |
| 3.46 ± 0.05 | VS |
| 3.38 ± 0.05 | S |
| 3.28 ± 0.05 | W |
| 3.20 ± 0.05 | S |
| 3.15 ± 0.05 | W |
| 2.89 ± 0.05 | M |

TABLE 2-continued

| X-ray diffraction pattern | |
|---|---|
| d(Å) | 100 I/Io |
| 2.51 ± 0.05 | W |

The silica source containing $SiO_2$ as a basic component, examples of which are those which have heretofore been used in the preparation of zeolites, include silica sol, silica gel, silica aerogel, silica hydrogel, silicic acid, silicate ester and sodium silicate. As the alumina source, there may be used known alumina sources which have heretofore been used in the preparation of zeolites, such as sodium aluminate, aluminium sulfate, aluminium nitrate, alumina sol, alumina gel, activated alumina, γ-alumina and α-alumina. Examples of the alkali source are sodium hydroxide and potassium hydroxide, of which sodium hydroxide is preferred. The alkali source is added so that OH⁻ is present in the reaction system preferably in the foregoing composition. It goes without saying that, for example, when using sodium silicate as the silica source and sodium aluminate as the alumina source, both also serve as the alkali source.

As the organic compound containing a carboxyl group used in the invention, there may be used various carboxylic acids, including aromatic, aliphatic and alicyclic carboxylic acids. It is presumed that these compounds are converted to alkali metal salts within the reaction system, but it goes without saying that they may be converted to alkali metal salts in advance of their use. If the alkali metal salts of carboxyl group-containing organic compounds are soluble in water, a preferable result is obtained.

The organic compound having a carboxyl group may contain other functional groups besides the carboxyl group, for example, a hydroxyl group or an amino group.

Organic carboxylic acids having not more than 18 carbon atoms and their functional derivatives are preferably used as carboxyl group-containing organic compounds. In the case of organic compounds not containing an aromatic ring, those having 1 to 12, preferably 3 to 6, carbon atoms are preferred. The number of carboxyl group contained in one molecule is preferably 1 to 3. Examples of such organic compounds include monobasic hydroxycarboxylic acids such as, lactic acid, hydracrylic acid, hydroxybutyric acid, and derivatives thereof; di- and polybasic hydroxycarboxylic acids such as tartronic acid, malic acid, tartaric acid, citric acid, and derivatives thereof; monobasic carboxylic acids such as propionic acid, butyric acid, valeic acid, caproic acid, acrylic acid, crotonic acid, methacrylic acid, and derivatives thereof; di- and polybasic carboxylic acids such as, malonic acid, succinic acid, glutaric acid, adipic acid, maleic acid, fumaric acid, and derivatives thereof. On the other hand, as aromatic ring-containing compounds, those having 1 to 2 aromatic rings and 1 to 3 carboxyl groups are preferred. Examples of such compounds are benzoic acid, phthalic acid, terephthalic acid, salicylic acid, para-hydroxybenzoic acid, toluic acid, and derivatives thereof. These organic compounds or derivatives thereof may be used alone or in combination.

In the preparation of a crystalline aluminosilicate zeolite, there often is performed the so-called isomorphous substitution, for example, part of silicon which is a component of the zeolite is replaced with germanium, or part of aluminium is replaced with gallium, chromium or iron. An isomorphous substitution compound can be produced by replacing part of the silica source in the reaction mixture with a germanium compound or by replacing part of the alumina source with a gallium, chromium or iron compound. Such a method is isomorphous substitution is also included in the method of the present invention.

It is possible, and as the case may be preferable, to add a mineralizer into the aqueous reaction mixture, such as the chloride, bromide, iodide, nitrate or sulfate of an alkali metal or an alkaline earth metal, in order to promote the crystallization to zeolite or improve the shape of the crystal. Examples of such a mineralizer include sodium carbonate, sodium sulfate, sodium chloride, potassium chloride, potassium bromide, potassium fluoride, barium chloride, and barium bromide.

It is preferable that the aqueous reaction mixture thus prepared to made a slurry as homogeneous as possible. Therefore, it is necessary to take ample care about the mixing order and time, agitation, etc. according to the starting materials used. Prior to crystallization, the slurried aqueous reaction mixture may be subjected to the so-called aging operation, that is, it may be allowed to stand for ranging a time from several hours to several days at a temperature lower than the crystallization temperature, for example, at room temperature. Such an aging operation may be omitted. Reaction conditions for the crystallization involve reaction temperatures ranging from 80° to 250° C., preferably from 100° to 200° C., and reaction times ranging from 5 hours to 30 days, preferably from 10 hours to 10 days. Optimum reaction conditions depend on the starting materials used and the composition of the aqueous reaction mixture. In general, the lower the reaction temperature, the longer the crystallization time required, and the higher the reaction temperature, the shorter the crystallization time. However, a too low or too high temperature would result in the formation of an amorphous substance or undesirable crystals. This is also the case with the reaction time, that is, a too short or too long reaction time would cause similar results.

The reaction mixture is crystallized in a closed vessel, for example, in an autoclave made of iron, stainless steel or lined with Teflon. Therefore, the reaction is usually carried out under the pressure which is produced naturally in dependence on the temperature. During crystallization, it is desirable that the reaction mixture be held in a homogeneous state by agitation either continuously or periodically. Particularly when the reaction temperature is high, it is desirable to perform agitation and mixing fully. The reaction product thus crystallized is cooled, then taken out of the vessel, washed with water and filtered. The water-washed and filtered zeolite is then dried if required.

The zeolite thus obtained is usually in the form of powder. With this powdered form, the zeolite is difficult to handle, so preferably it is agglomerated, for example, by a compression device or an extrusion device. Particularly in the case of extrusion device, it is preferable to use a binder in order to improve the kneading and extrusion performance of zeolite or impart strength to the resulting formed article. It goes without saying that a binder need not be used if the agglomeration can be done to a satisfactory extent even without using a binder. As the binder, there may be used, for example, natural clays such as kaolin, bentonite and montmorillonite, and synthetic binders such as silica sol, alumina sol and alumina gel. The allowable amount of the binder to be used differs according to purposes of use of the resultant articles. For example, if the agglomerated product is to be used as an adsorbent, it is preferable that the amount of the binder be as small as possible, provided an agglomerated product is obtainable and strength can be imparted thereto. Preferably it is not more than 30% by weight and more preferably not more than 20% by weight.

In case the agglomerated product is to be used as a catalyst, the amount of the binder may be made larger than in the case of an adsorbent, and it can be larger than 90% by weight.

The agglomerated product thus obtained is dried and subsequently calcined. The drying is performed at 50° to 250° C., preferably 100° to 200° C., for over 0.1 hour, preferably 0.5 to 48 hours. The calcining is carred out at 300° to 700° C. for over 0.1 hour, preferably at 400° to 600° C. for 0.5 to 24 hours.

The agglomerated product thus dried and calcined is subjected to further treatments according to purposes of its utilization. For example, if it is to be utilized as an adsorbent, it is subjected to ion exchange with mono-, di- or polyvalent metal cations, ammonium ions, or hydrogen ions. The ion exchange usually is carried out in an aqueous solution according to either the batch method or the flow method. It goes without saying that the ion-exchange treatment may be applied before agglomeration of the zeolite. After the ion-exchange treatment, the zeolite is washed with water and dried, and then calcined before use.

In case the agglomerated zeolite is to be utilized as a catalyst, usually it is ion exchanged in an aqueous solution containing ammonium ions, hydrogen ions, or di- or trivalent metal cations such as rare earth metal cations, thereby imparting an acidity to the zeolite. The zeolite having an acidity exhibits a high catalytic activity in many reactions, for example, isomerization, disproportionation, alkylation, dealkylation, decomposition, reforming, hydration, dehydration, polymerization and hydrocracking. As previously noted, the ion-exchange treatment may be applied before agglomeration of the zeolite. After the ion-exchange treatment, the zeolite is washed with water and dried, and then calcined before use. In addition to the ion exchange, the zeolite may be combined in its utilization as a catalyst with such a component as iron, cobalt, nickel, chromium, manganese, molybdenum, tungsten, vanadium, rhenium, platinum, rhodium, ruthenium, or palladium, by ion exchange, by impregnation or by a physical mixing. This is also one mode of use of the zeolites of the present invention.

The following examples are given to further illustrate the invention.

EXAMPLE 1

9.23 g. of a solid sodium hydroxide and 12.5 g. of tartaric acid were dissolved in 341 g. of water, to which was then added 17.5 g. of a sodium aluminate solution to prepare a homogeneous solution. Then, 66.0 g. of silicic acid powder was added into this mixed solution slowly with stirring to prepare a homogeneously slurried, aqueous reaction mixture. The composition, in terms of mole ratios, of this reaction mixture was as follows:

| | |
|---|---|
| $SiO_2/Al_2O_3$ | 30 |

-continued

| | |
|---|---|
| $H_2O/SiO_2$ | 20 |
| $OH^-/SiO_2$ | 0.17 |
| $A/Al_2O_3$ | 2.5 |

The reaction mixture was placed in an autoclave having a capacity of 500 ml. and, after closing the autoclave, it was allowed to react at 160° C. for 72 hours with stirring.

Thereafter, the reaction product was taken out of the autoclave, washed with distilled water until its pH was almost neutral, then filtered and dried overnight at 120° C.

The product thus obtained was a zeolite (hereinafter referred to as "TZ-01") having the X-ray diffraction pattern shown in Table 3.

TABLE 3

| X-ray diffraction pattern | | | | | |
|---|---|---|---|---|---|
| d (Å) | $100I/I_{MAX}$ | d (Å) | $100I/I_{MAX}$ | d (Å) | $100I/I_{MAX}$ |
| 11.30 | 49 | 4.29 | 8 | 3.06 | 10 |
| 10.09 | 33 | 4.12 | 3 | 2.99 | 16 |
| 9.82 | 11 | 4.00 | 8 | 2.89 | 3 |
| 9.11 | 6 | 3.86 | 100 | 2.84 | 2 |
| 7.51 | 5 | 3.83 | 82 | 2.75 | 4 |
| 7.14 | 2 | 3.76 | 50 | 2.62 | 3 |
| 6.75 | 8 | 3.74 | 55 | 2.58 | 2 |
| 6.59 | 6 | 3.66 | 27 | 2.50 | 6 |
| 6.40 | 9 | 3.62 | 5 | 2.42 | 4 |
| 6.04 | 12 | 3.50 | 8 | 2.40 | 3 |
| 5.75 | 10 | 3.47 | 15 | 2.04 | 3 |
| 5.61 | 13 | 3.38 | 9 | 2.02 | 9 |
| 5.40 | 2 | 3.33 | 8 | 2.00 | 11 |
| 5.17 | 3 | 3.27 | 2 | 1.97 | 3 |
| 5.02 | 8 | 3.23 | 2 | 1.95 | 3 |
| 4.63 | 4 | 3.20 | 2 | 1.92 | 2 |
| 4.52 | 3 | 3.16 | 2 | 1.88 | 3 |
| 4.39 | 10 | | | | |

EXAMPLE 2

5.77 g. of a solid hydroxide and 11.5 g. of salicylic acid were dissolved in 344 g. of water, to which was then added 17.5 g. of a sodium aluminate solution to prepare a homogeneous solution.

Then, 66.0 g. of silicic acid powder was added into this mixed solution slowly with stirring to prepare a homogeneously slurried, aqueous reaction mixture. The composition, in terms of mole ratios of this reaction mixture was as follows:

| | |
|---|---|
| $SiO_2/Al_2O_3$ | 30 |
| $H_2O/SiO_2$ | 20 |
| $OH^-/SiO_2$ | 0.17 |
| $A/Al_2O_3$ | 2.5 |

The reaction mixture was charged into an autoclave having a capacity of 500 ml. and, after closing the autoclave, it was allowed to react at 160° C. for 72 hours with stirring.

Thereafter, the reaction product was taken out of the autoclave, washed with distilled water until its pH was almost neutral, then filtered and dried overnight at 120° C.

The product thus obtained was the zeolite "TZ-01" having basically the same X-ray diffraction pattern as that shown in Table 3.

EXAMPLE 3

13.5 g. of a solid sodium hydroxide and 25.0 g. of tartaric acid were dissolved in 329 g. of water, to which was then added 34.9 g. of a sodium aluminate solution to prepare a homogeneous solution. Then, 66.0 g. of silicic acid powder was added into this mixed solution slowly with stirring to prepare a homogeneously slurried, aqueous reaction mixture. The composition, in terms of mole ratios, of this reaction mixture was as follows:

| | |
|---|---|
| $SiO_2/Al_2O_3$ | 15 |
| $H_2O/SiO_2$ | 20 |
| $OH^-/SiO_2$ | 0.22 |
| $A/Al_2O_3$ | 2.5 |

The reaction mixture was charged into an autoclave having a capacity of 500 ml. and, after closing the autoclave, it was allowed to react at 160° C. for 72 hours with stirring.

Thereafter, the product was taken out of the autoclave, washed with distilled water until its pH was almost neutral, then filtered and dried overnight at 120° C.

The product thus obtained was a zeolite (hereinafter referred to as "TZ-02") having the X-ray diffraction pattern shown in Table 4.

As a result of composition analysis, this zeolite proved to have the following composition, in terms of mole ratios, in an anhydrous state:

0.98 $Na_2O$ $Al_2O_3$ 13.3 $SiO_2$

TABLE 4

| X-ray diffraction pattern | | | |
|---|---|---|---|
| d (Å) | $100I/I_{MAX}$ | d (Å) | $100I/I_{MAX}$ |
| 13.67 | 19 | 3.28 | 9 |
| 10.28 | 7 | 3.22 | 38 |
| 9.09 | 50 | 3.20 | 43 |
| 6.58 | 37 | 3.17 | 7 |
| 6.40 | 24 | 3.10 | 4 |
| 6.06 | 9 | 2.94 | 4 |
| 5.79 | 15 | 2.89 | 24 |
| 5.04 | 2 | 2.71 | 3 |
| 4.89 | 1 | 2.63 | 2 |
| 4.54 | 35 | 2.56 | 5 |
| 4.23 | 2 | 2.51 | 14 |
| 4.15 | 4 | 2.46 | 4 |
| 3.99 | 76 | 2.43 | 4 |
| 3.84 | 11 | 2.23 | 2 |
| 3.76 | 16 | 2.04 | 7 |
| 3.63 | 4 | 2.01 | 4 |
| 3.53 | 10 | 1.95 | 7 |
| 3.47 | 100 | 1.91 | 2 |
| 3.38 | 59 | 1.88 | 7 |

COMPARATIVE EXAMPLE 1

2.34 g. of a solid caustic soda and 17.5 g. of a sodium aluminate solution were dissolved in 344 g. of water to prepare a homogeneous solution.

Then, 66.0 g. of silicic acid powder was added into this mixed solution slowly with stirring to prepare a homogeneously slurried, aqueous reaction mixture.

The composition, in terms of mole ratios, of this reaction mixture was as follows:

| | |
|---|---|
| $SiO_2/Al_2O_3$ | 30 |
| $H_2O/SiO_2$ | 20 |
| $OH^-/SiO_2$ | 0.17 |
| $A/Al_2O_3$ | 0 |

In the same manner as in Example 1, the reaction mixture was allowed to react at 160° C. for 72 hours with stirring in the autoclave.

By X-ray diffraction the product thus obtained proved to be amorphous.

EXAMPLE 4

Using various carboxylic acids and in the same manner as in Example 1 there were prepared aqueous reaction mixtures having the following composition in terms of mole ratios, and these reaction mixtures were allowed to react at 160° C. for 72 hours with stirring in the autoclave, the results of which are as set out in Table 5:

| | |
|---|---|
| $SiO_2/Al_2O_3$ | 30 |
| $H_2O/SiO_2$ | 20 |
| $OH^-/SiO_2$ | 0.17 |
| $A/Al_2O_3$ | 2.5 |

TABLE 5

Zeolite preparation using various carboxylic acids

| A | Type of zeolite produced | | |
|---|---|---|---|
| Propionic acid | TZ-01 | >> | TZ-02 |
| n-Caproic acid | TZ-01 | ≈ | TZ-02 |
| Succinic acid | TZ-01 | >> | TZ-02 |
| Adipic acid | TZ-01 | ≈ | TZ-02 |
| Lactic acid | TZ-01 | | |
| Malic acid | | | TZ-02 |
| Citric acid | | | TZ-02 |
| L-glutaric acid | | | TZ-02 |
| 4-amino n-butyric acid | TZ-01 | ≈ | TZ-02 |

TABLE 5-continued

Zeolite preparation using various carboxylic acids

| A | Type of zeolite produced | | |
|---|---|---|---|
| Benzoic acid | | | TZ-02 |
| 0-toluic acid | TZ-01 | | |
| Terephthalic acid | TZ-01 | > | TZ-02 |

EXAMPLE 5

The $SiO_2/Al_2O_3$ ratio was changed with respect to tartaric acid, propionic acid and salicylic acid, and in this condition zeolites were prepared, the results of which are as set out in Table 6.

From Table 6 it is seen that when the $SiO_2/Al_2O_3$ ratio of the reaction mixture is 30 or more, the zeolite "TZ-01" is apt to be produced, and when this ratio is smaller than 30, the zeolite "TZ-02" is apt to be produced.

TABLE 6

Influence of $SiO_2/Al_2O_3$ ratio in zeolite preparation

| | Composition, in terms of mole ratios, of reaction mixture | | | | | | | |
|---|---|---|---|---|---|---|---|---|
| A | $SiO_2/Al_2O_3$ | $H_2O/SiO_2$ | $OH^-/SiO_2$ | $A/Al_2O_3$ | Conditions for crystallization | Type of zeolite produced | | |
| Tartaric acid | 10 | 20 | 0.28 | 1.25 | 160° C., 72 hr. | | | TZ-02 |
| | 15 | 20 | 0.22 | 1.25 | " | | | TZ-02 |
| | 20 | 20 | 0.17 | 2.5 | " | | | TZ-02 |
| | 30 | 20 | 0.17 | 2.5 | " | TZ-01 | | |
| | 50 | 20 | 0.17 | 2.5 | " | TZ-01 | | |
| | 100 | 25 | 0.21 | 7.0 | " | TZ-01 | | |
| Propionic acid | 15 | 20 | 0.28 | 2.5 | 160° C., 72 hr. | | | TZ-02 |
| | 30 | 20 | 0.17 | 2.5 | " | TZ-01 | >> | TZ-02 |
| | 100 | 25 | 0.28 | 7.0 | " | TZ-01 | > | TZ-02 |
| Salicylic acid | 15 | 20 | 0.28 | 2.5 | 160° C., 72 hr. | | | TZ-02 |
| | 30 | 20 | 0.17 | 22.5 | " | TZ-01 | | |
| | 100 | 25 | 0.28 | 7.0 | " | TZ-01 | | |

EXAMPLE 6

The alkalinity ($OH^-/SiO_2$) was changed with respect to tartaric acid, propionic acid and salicylic acid, and in this condition zeolites were prepared, the results of which are as shown in Table 7.

From Table 7 it is seen that when the $OH^-/SiO_2$ ratio of the reaction mixture is high, the zeolite "TZ-02" is apt to be produced rather than the zeolite "TZ-01".

TABLE 7

Influence of alkalinity ($OH^-/SiO_2$) in zeolite preparation

| | Composition, in terms of mole ratios, of reaction mixture | | | | | | | |
|---|---|---|---|---|---|---|---|---|
| A | $SiO_2/Al_2O_3$ | $H_2O/SiO_2$ | $OH^-/SiO_2$ | $A/Al_2O_3$ | Conditions for crystallization | Type of zeolite produced | | |
| Tartaric acid | 30 | 20 | 0.15 | 2.5 | 160° C., 72 hr. | TZ-01 | | |
| | " | " | 0.17 | " | " | TZ-01 | | |
| | " | " | 0.25 | " | " | | | TZ-02 |
| | " | " | 0.35 | " | " | | | TZ-02 |
| Propionic acid | 30 | 20 | 0.17 | 2.5 | 160° C., 72 hr. | TZ-01 | >> | TZ-02 |
| | " | " | 0.25 | " | " | | | TZ-02 |
| Salicylic acid | 30 | 20 | 0.17 | 2.5 | 160° C., 72 hr. | TZ-01 | | |
| | " | " | 0.22 | " | " | TZ-01 | < | TZ-02 |
| | " | " | 0.25 | " | " | | | TZ-02 |

EXAMPLE 7

With respect to tartaric acid, the influence of $A/Al_2O_3$ ratio in zeolite preparation was investigated, the results of which are as shown in Table 8.

TABLE 8

Influence of A/Al₂O₃ ratio in zeolite preparation

| A | Composition, in terms of mole ratios, of reaction mixture | | | | Conditions for crystallization | Type of zeolite produced |
|---|---|---|---|---|---|---|
| | SiO₂/Al₂O₃ | H₂O/SiO₂ | OH⁻/SiO₂ | A/Al₂O₃ | | |
| Tartaric acid | 10 | 20 | 0.28 | 0.00 | 160° C., 48 hr. | Amorphous |
| | " | " | " | 0.30 | " | TZ-02 |
| | " | " | " | 0.50 | " | TZ-02 |
| | " | " | " | 0.75 | " | TZ-02 |
| | " | " | " | 1.25 | " | TZ-02 |
| | 15 | " | 0.22 | 0.00 | 160° C., 72 hr. | Amorphous |
| | " | " | " | 1.25 | " | TZ-02 |
| | " | " | " | 2.5 | " | TZ-02 |
| | 30 | " | 0.17 | 2.5 | " | TZ-01 |
| | " | " | " | 5.0 | " | TZ-01 ≈ TZ-02 |
| | 100 | 25 | 0.25 | 5.0 | " | TZ-01 |
| | " | " | " | 7.0 | " | TZ-01 |
| | " | " | " | 10 | " | TZ-01 |
| | " | " | " | 16 | " | TZ-01 |
| | " | " | 0.30 | 5.0 | " | TZ-01 |
| | " | " | " | 7.0 | " | TZ-01 |

EXAMPLE 8

With respect to tartaric acid, the influence of crystallization temperature and crystallization time in zeolite preparation was investigated, the results of which are as shown in Table 9.

TABLE 9

Influence of crystallization temperature and crystallization time

| A | Composition, in terms of mole ratios, of reaction mixture | | | | Conditions for crystallization | Type of zeolite produced |
|---|---|---|---|---|---|---|
| | SiO₂/Al₂O₃ | H₂O/SiO₂ | OH⁻/SiO₂ | A/Al₂O₃ | | |
| Tartaric acid | 30 | 20 | 0.17 | 2.5 | 140° C., 72 hr. | TZ-01 |
| | " | " | " | " | 160° C., 28 hr. | TZ-01 |
| | " | " | " | " | 160° C., 48 hr. | TZ-01 |
| | " | " | " | " | 160° C., 72 hr. | TZ-01 |
| | " | " | " | " | 160° C., 96 hr. | TZ-01 |
| | 100 | " | 0.25 | 7.0 | 160° C., 72 hr. | TZ-01 |
| | " | 25 | 0.24 | " | 160° C., 72 hr. | TZ-01 |
| | " | " | " | " | 180° C., 72 hr. | TZ-01 |

What is claimed is:

1. A process for preparing a crystalline aluminosilicate zeolite, which process comprises reacting an aqueous reaction mixture containing a silica source, an alumina source, an alkali source and a single type of organic template, said single type of organic template consisting essentially of an organic compound having 3 to 6 carbon atoms and 1 to 3 carboxyl groups and not containing an aromatic ring, and the composition, in terms of mole ratios, of said reaction mixture being as follows:

| | |
|---|---|
| SiO₂/Al₂O₃ | above 20 |
| H₂O/SiO₂ | 5 to 100 |
| OH⁻/SiO₂ | 0.05 to 0.40 |
| A/Al₂O₃ | 0.10 to 200 | wherein A represents said organic compound, said process being conducted at a crystallization temperature of 140°–180° C. to form a crystalline aluminosilicate zeolite having the following X-ray diffraction pattern:

| d(Å) | 100 I/Io |
|---|---|
| 11.2 ± 0.2 | S |
| 10.1 ± 0.2 | S |
| 9.8 ± 0.2 | M |
| 6.37 ± 0.1 | W |
| 6.00 ± 0.1 | W |
| 5.71 ± 0.1 | W |
| 5.58 ± 0.1 | W |
| 4.37 ± 0.08 | W |
| 4.27 ± 0.08 | W |
| 3.86 ± 0.08 | VS |
| 3.82 ± 0.02 | VS |
| 3.75 ± 0.08 | S |
| 3.72 ± 0.08 | S |
| 3.66 ± 0.05 | M |
| 3.00 ± 0.05 | M |
| 2.00 ± 0.05 | W | wherein VS=very strong, S=strong, M=medium strength and W=weak.

2. A process for preparing a crystalline aluminosilicate zeolite, which process comprises reacting an aqueous reaction mixture containing a silica source, an alumina source, an alkali source and a single type of organic template, said single type of organic template consisting essentially of an organic compound having 3 to 6 carbon atoms and 1 to 3 carboxyl groups and not containing an aromatic ring, and the composition, in terms of mole ratios, of said reaction mixture being as follows:

| | |
|---|---|
| SiO₂/Al₂O₃ | 15 to 75 |
| H₂O/SiO₂ | 10 to 50 |
| OH⁻/SiO₂ | 0.14 to 0.40 |
| A/Al₂O₃ | 0.10 to 50 | wherein A represents said organic compound, said process being conducted at a crystallization temperature of 140°–180° C. to form a crystalline aluminosilicate zeolite having the following X-ray diffraction pattern:

| d(Å) | 100 I/Io |
|---|---|
| 13.6 ± 0.2 | M |
| 10.2 ± 0.2 | W |
| 9.0 ± 0.2 | S |
| 6.56 ± 0.1 | S |

-continued

| d(Å) | 100 I/Io |
|---|---|
| 6.40 ± 0.1 | M |
| 6.05 ± 0.1 | W |
| 5.80 ± 0.1 | M |
| 4.52 ± 0.08 | M |
| 3.99 ± 0.08 | S |
| 3.83 ± 0.08 | W |
| 3.76 ± 0.08 | W |
| 3.53 ± 0.05 | W |
| 3.46 ± 0.05 | VS |
| 3.38 ± 0.05 | S |
| 3.28 ± 0.05 | W |
| 3.20 ± 0.05 | S |
| 3.15 ± 0.05 | W |
| 2.89 ± 0.05 | M |
| 2.51 ± 0.05 | W | wherein VS=very strong, S=strong, M=medium strength and W=weak.

3. A process according to claim 1 or 2, in which said organic compound is an aliphatic carboxylic acid containing a hydroxyl group.

4. A process according to claim 1 or 2, in which said organic compound is a member selected from the group consisting of lactic, hydracrylic, hydroxybutyric, tartronic, malic, tartaric, citric, propionic, butyric, valeric, caproic, acrylic, crotonic, methacrylic, malonic, succinic, glutaric, adipic, maleic and fumaric acids.

5. A process according to claim 1 or 2, in which said organic compound is a compound that is water soluble in its alkali metal salt form.

6. A process according to claim 1 or 2, in which said organic compound is tartaric acid.

7. A process according to claim 1 or 2, in which said process requires 5 hours to 30 days for completion.

* * * * *